United States Patent
Jenko

(10) Patent No.: US 7,632,450 B2
(45) Date of Patent: Dec. 15, 2009

(54) METHOD ADJUSTABLE HOT RUNNER ASSEMBLY SEALS AND TIP HEIGHT USING ACTIVE MATERIAL ELEMENTS

(75) Inventor: Edward J. Jenko, Essex Junction, VT (US)

(73) Assignee: Husky Injection Molding Systems Ltd. (CA)

( * ) Notice: Subject to any disclaimer, the term of this patent is extended or adjusted under 35 U.S.C. 154(b) by 406 days.

(21) Appl. No.: 11/567,435

(22) Filed: Dec. 6, 2006

(65) Prior Publication Data
US 2007/0108662 A1 May 17, 2007

Related U.S. Application Data

(62) Division of application No. 10/830,403, filed on Apr. 23, 2004, now Pat. No. 7,165,958.

(51) Int. Cl.
*B29C 45/20* (2006.01)
(52) U.S. Cl. ............... 264/478; 264/328.8; 264/328.15
(58) Field of Classification Search ............ 264/328.1, 264/328.8, 299, 328.15, 478
See application file for complete search history.

(56) References Cited

U.S. PATENT DOCUMENTS

| | | | |
|---|---|---|---|
| 4,219,323 A * | 8/1980 | Bright et al. ............... | 425/572 |
| 4,420,454 A | 12/1983 | Kawaguchi et al. | |
| 4,469,649 A | 9/1984 | Ibar | |
| 4,489,771 A | 12/1984 | Takeshima et al. | |
| 4,556,377 A | 12/1985 | Brown | |
| 4,588,367 A | 5/1986 | Schad | |
| 4,660,801 A | 4/1987 | Schad | |
| 4,747,770 A | 5/1988 | Schmidt | |
| 4,828,769 A | 5/1989 | Maus et al. | |
| 4,995,455 A | 2/1991 | Mathur | |
| 5,192,555 A | 3/1993 | Arnott | |
| 5,237,238 A | 8/1993 | Berghaus et al. | |

(Continued)

FOREIGN PATENT DOCUMENTS

CA   2 474 024 A1   8/2003

(Continued)

OTHER PUBLICATIONS

Marco: Structure and characteristics of piezokeramisher pile actuators [online], marco Systemanalyse und Entwicklung GmbH, Sep. 16, 2003 Translated Version (from German to English by Yahoo translation tool) [retrieved on Oct. 13, 2004] < URL http://www.marco.de./E/D/pa/017.html>.

(Continued)

*Primary Examiner*—Jill L Heitbrink
(74) *Attorney, Agent, or Firm*—Katten Muchin Rosenman LLP

(57) ABSTRACT

Method for sealing interfaces within an injection mold having a first surface and a second surface includes structure and/or steps whereby an active material actuator configured to be disposed in a manner suitable for generating a force between the first surface and the second surface. The active material actuator is configured to generate a force in response to sense signals from a transmission structure. Methods are also provided for centering a nozzle tip within a gate opening, and adjusting tip height of a nozzle tip with respect to a gate opening, also using active material inserts.

23 Claims, 4 Drawing Sheets

U.S. PATENT DOCUMENTS

| | | | |
|---|---|---|---|
| 5,238,389 A | | 8/1993 | Brandau et al. |
| 5,374,182 A | * | 12/1994 | Gessner ............... 425/562 |
| 5,397,230 A | | 3/1995 | Brew |
| 5,439,371 A | | 8/1995 | Sawaya |
| 5,518,393 A | | 5/1996 | Gessner |
| 5,683,730 A | | 11/1997 | Katsumata et al. |
| 5,853,776 A | | 12/1998 | Meijer |
| 5,896,640 A | * | 4/1999 | Lazinski et al. ............... 29/428 |
| 6,074,191 A | | 6/2000 | Gellert et al. |
| 6,203,747 B1 | | 3/2001 | Grunitz |
| 6,289,259 B1 | | 9/2001 | Choi et al. |
| 6,343,925 B1 | | 2/2002 | Jenko |
| 6,358,039 B1 | * | 3/2002 | Manner et al. ............... 425/564 |
| 6,539,853 B1 | * | 4/2003 | Hess et al. ............... 100/270 |
| 6,629,831 B2 | | 10/2003 | Wei et al. |
| 2006/0214469 A1 | * | 9/2006 | Aase et al. ............... 296/180.5 |

FOREIGN PATENT DOCUMENTS

| | | |
|---|---|---|
| EP | 0 448 855 A1 | 10/1991 |
| JP | 10-012649 A | 1/1998 |

OTHER PUBLICATIONS

Piezo Square Stack Actuators: pss . . . [online], marco Systemanalyse und Entwicklung GmbH, Jan. 19, 2004, [retrieved on Nov. 13, 2004], <URL http://www.marco.de/E/D/pss/001.html>.

Piezoceramic Stack Actuators: pa/ps [online], marco Systemanaiyse und Entwicklung GmbH, Feb. 17, 2004, [retrieved on Oct. 13, 2004], <URL http://wwvv.marco.de/E/D/pa/ps/007.html>.

Mide: Active Materials [online] Mide Teccnology Corporation, [retrieved on Oct. 13, 2004] < URL http://www.mide.com/active. sub.--materials.html>.

William J. Tobin, "Venting from the Inside", Plastics, Machinery & Equipment, Feb. 1990, p. 55.

Patent Abstracts of Japan for JP 10-012649, published Jan. 16, 1998.

* cited by examiner

METHOD ADJUSTABLE HOT RUNNER ASSEMBLY SEALS AND TIP HEIGHT USING ACTIVE MATERIAL ELEMENTS

This application is a divisional of U.S. patent application Ser. No. 10/830,403, filed Apr. 23, 2004, now U.S. Pat. No. 7,165,958, incorporated herein by reference.

BACKGROUND OF THE INVENTION

1. Field of the Invention

The present invention relates to a method and apparatus for providing adjustable hot runner assembly seals, as well as adjustable hot runner nozzle tip height, by utilizing active material elements in injection molding machine equipment (e.g., hot runner nozzle assemblies). "Active materials" are a family of shape altering materials such as piezoactuators, piezoceramics, electrostrictors, magnetostrictors, shape memory alloys, and the like. In the present invention, they are used to adjust the hot runner assembly seals and to adjust the nozzle tip height, thereby improving the quality of the molded article, the life of the nozzle assembly, and the resin sealing. The active material elements may also be used as sensors.

2. Related Art

Active materials are characterized as transducers that can convert one form of energy to another. For example, a piezoactuator (or motor) converts input electrical energy to mechanical energy causing a dimensional change in the element, whereas a piezo sensor (or generator) converts mechanical energy—a change in the dimensional shape of the element—into electrical energy. One example of a piezoceramic transducer is shown in U.S. Pat. No. 5,237,238 to Berghaus. One supplier of piezo actuators is Marco Systemanalyse und Entwicklung GmbH, Hans-Böckler-Str. 2, D-85221 Dachau, Germany, and their advertising literature and website illustrate such devices. Typically an application of 1,000 volt potential to a piezoceramic insert will cause it to "grow" approximately 0.0015"/inch (0.15%) in thickness. Another supplier, Mide Technology Corporation of Medford, Me., has a variety of active materials including magnetostrictors and shape memory alloys, and their advertising literature and website illustrate such devices, including material specifications and other published details.

U.S. Pat. No. 4,588,367 to Schad and U.S. Pat. No. 6,343,925 to Jenko each disclose a hot runner nozzle with a spring means for taking up thermal expansion of the assembly, in order to ensure that a good seal between the nozzle body and the hot runner manifold is maintained throughout the range of operating conditions.

U.S. Pat. No. 5,853,776 to Meijer discloses a spring means for a backup insulator. It also discloses a nozzle housing insulator and a hot runner manifold melt channel plug installation. These sealing structures suffer from being passive devices relatively incapable of being actively controlled or capable of different levels of performance.

Thus, what is needed is a new technology capable of sealing the various injection molding machine surface with fine levels of adjustable control, and preferably with embedded sensors and closed loop control of the sealing function.

SUMMARY OF THE INVENTION

It is an advantage of the present invention to provide injection molding machine apparatus and methods to overcome the problems noted above, and to advantageously provide an effective, efficient means for adjusting nozzle tip height and hot runner seals in an injection molding machine.

According to a first aspect of the present invention, structure and/or steps are provided for sealing a first surface and a second surface in an injection mold, including an active material actuator disposed to move the first surface toward the second surface, and transmission structure configured to transmit electricity, in use, to said active material actuator, to cause said active material actuator to seal the first surface and the second surface.

According to a second aspect of the present invention, structure and/or steps are provided for moving the nozzle tip of an injection mold hot runner nozzle with respect to a mold gate, including an active material actuator configured to move the nozzle tip with respect to the mold gate, and transmission structure configured to supply an actuation signal, in use, to said active material actuator to cause said active material actuator to change at least one dimension to effect relative movement between the nozzle tip and the mold gate.

According to a third aspect of the present invention, structure and/or steps are provided for a sealing apparatus for an injection mold having a manifold plate and a nozzle, including a piezo-electric sensor configured to be disposed adjacent at least one of the nozzle and the manifold plate, and configured to sense a compressive force applied between the nozzle and the manifold plate, and to generate a corresponding sense signal; a piezo-electric actuator configured to be disposed between the nozzle and the manifold plate, and configured to change dimension upon application of an actuation signal to change a sealing force between the nozzle and the manifold plate; and transmission structure coupled, in use, to said piezo-electric sensor and to said piezo-electric actuator, and configured to carry the sense signal and the actuation signal.

BRIEF DESCRIPTION OF THE DRAWINGS

Exemplary embodiments of the presently preferred features of the present invention will now be described with reference to the accompanying drawings in which.

DETAILED DESCRIPTION OF THE PRESENTLY PREFERRED EXEMPLARY EMBODIMENTS

1. Introduction

Figure 1:
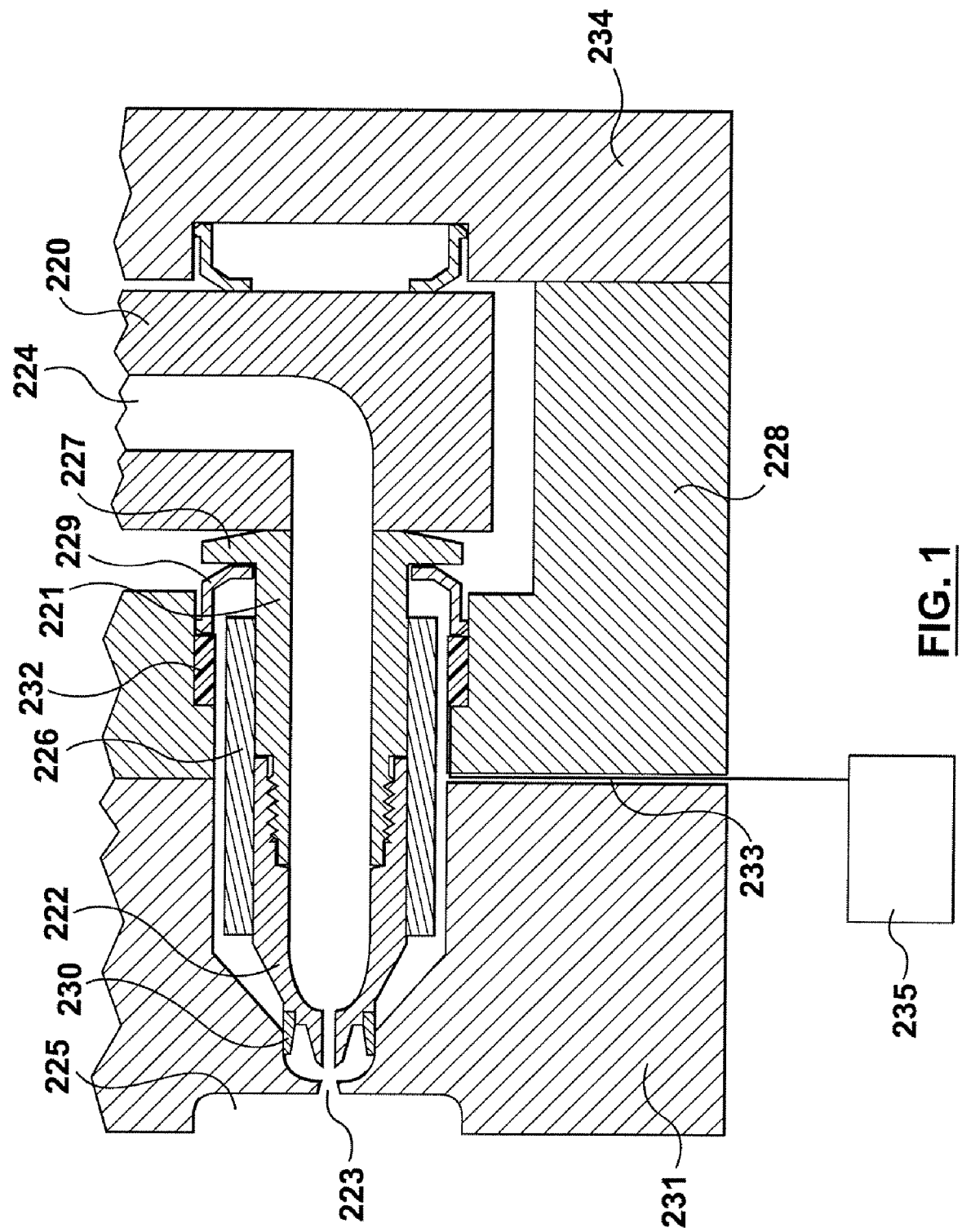
FIG. 1 shows a hot runner nozzle assembly incorporating an embodiment according to the present invention relating to the nozzle housing/manifold seal interface.

The present invention will now be described with respect to several embodiments in which a plastic injection-molding machine is supplied with one or more active material elements which serve to detect and/or correct mechanical misalignment within the hot runner assembly seals, and the nozzle tip height. However, the active material sensors and/or actuators may be placed in any location in the injection molding apparatus in which alignment/sealing problems could be encountered. Other applications for such active material elements are discussed in the following related applications: entitled (1) U.S. patent application Ser. No. 10/830,434, filed concurrently on Apr. 23, 2004, entitled "Method and Apparatus for Countering Mold Deflection and Misalignment Using Active Material Elements", (2) U.S. patent application Ser. No. 10/830,435, filed concurrently on Apr. 23, 2004, entitled "Method and Apparatus for Assisting Ejection from an Injection Molding Machine using Active Material Elements", (3) U.S. patent application Ser. No. 10/830,438, filed concurrently on Apr. 23, 2004, entitled "Method and Apparatus for Controlling a Vent Gap with Active Material Elements", (4) U.S. patent application Ser. No. 10/830,485, filed concurrently on Apr. 23, 2004, entitled "Method and Apparatus for Mold Component Locking Using Active Material Elements", (5) U.S. patent application Ser. No. 10/830,488, filed concurrently on Apr. 23, 2004, entitled "Methods and Apparatus for Vibrating Melt in an Injection Molding Machine Using Active Material Elements", (6) U.S. patent application Ser. No. 10/830,436, filed concurrently on Apr. 23, 2004, entitled "Method and Apparatus for Injection Compression Molding Using Active Material Elements", and (7) U.S. patent application Ser. No. 10/830,437, filed concurrently on Apr. 23, 2004, entitled "Control System for Utilizing Active Material Elements in a Molding System".

As discussed above, there is a need in the art for a method and apparatus for measuring and then compensating for thermal expansion and vibration-induced changes in an injection molding machine nozzle body in a proactive manner by providing active material means and methods for adjusting hot runner seals and/or nozzle tip heights. In the following description, piezoceramic inserts are described as the preferred active material. However, other materials from the active material family, such as magnetostrictors and shape memory alloys could also be used in accordance with the present invention. A list of possible alternate active materials and their characteristics is set forth below in Table 1, and any of these active materials could be used in accordance with the present invention:

TABLE 1

Comparison of Active Materials

| Material | Temperature Range (° C.) | Nonlinearity (Hysteresis) | Structural Integrity | Cost/Vol. ($/cm3) | Technical Maturity |
|---|---|---|---|---|---|
| Piezoceramic PZT-5A | −50-250 | 10% | Brittle Ceramic | 200 | Commercial |
| Piezo-single crystal TRS-A | — | <10% | Brittle Ceramic | 32000 | Research |
| Electrostrictor PMN | 0-40 | Quadratic <1% | Brittle Ceramic | 800 | Commercial |
| Magnetostrictor Terfenol-D | −20-100 | 2% | Brittle | 400 | Research |
| Shape Memory Alloy Nitinol | Temp. Controlled | High | OK | 2 | Commercial |
| Magn. Activated SMA NiMnGa | <40 | High | OK | 200 | Preliminary Research |
| Piezopolymer PVDF | −70-135 | >10% | Good | 15* | Commercial |

(information derived from www.mide.com)

2. The Structure of the First Embodiment

The first preferred embodiment of the present invention is shown in FIG. 1, which depicts a hot runner nozzle assembly including a hot runner manifold 220, a manifold backing plate 234, a hot runner nozzle body 221, tip 222 and gate 223. Melt channel 224 conveys molten resin through the manifold, nozzle and gate to the mold cavity 225. The nozzle is heated by heater 226 that, in addition to maintaining the molten state of the resin as it flows through the nozzle, also causes the nozzle body to increase in length and diameter due to thermal expansion.

The nozzle body 221 has a head 227 that is pressed against the manifold 220 to ensure that a seal is effected at the connection of the two surfaces, so that resin passing through the melt channel 224 does not leak at the interface when subjected to injection pressure. The nozzle body 221 is typically positioned within the manifold plate 228 by nozzle insulator 229, and positioned within the mold cavity insert 231 by tip insulator 230.

According to the presently preferred embodiment according to the present invention, an active material (e.g., piezoceramic) actuator 232 is located between the nozzle insulator 229 and the manifold plate 228. The actuator 232 is preferably driven by a controller 235 through wiring 233, although wireless methods of control are also possible. It is also envisioned that the actuator 232 may be positioned in other locations within the hot runner assembly, so long as the location allows the actuation of the element to result in the hot runner nozzle body head 227 being sealingly pressed against hot runner manifold 220. For example, actuators may be located at any or all of: the tip end of the hot runner nozzle tip 222, between the hot runner manifold 220 and the manifold backing plate 234, between nozzle insulator 229 and nozzle body head 227, as an alternative or in addition to the location shown in FIG. 1.

Piezoceramic actuator 232 is preferably a single actuator that is annular and/or tubular in shape. According to a presently preferred embodiment, the actuator is made of piezoceramic, is about 30.0 mm long and 25.0 mm in diameter, and increases in length by approximately 50 microns when a voltage of 1000 V is applied via wiring 233. However, use of multiple actuators and/or actuators having other shapes are contemplated as being within the scope of the invention, and the invention is therefore not to be limited to any particular configuration of the piezoceramic actuator 232.

Preferably, one or more separate piezoceramic sensors 236 may be provided adjacent the actuator 232 (or between any or the relevant surfaces described above) to detect pressure caused by positional changes of the hot runner nozzle body 221 with respect to the hot runner manifold 220. Preferably, the sensors 236 provide sense signals to the controller 235. The piezo-electric elements used in accordance with the preferred embodiments of the present invention (i.e., the piezoelectric sensors and/or piezo-electric actuators) may comprise any of the devices manufactured by Marco Systemanalyse und Entwicklung GmbH. The piezo-electric sensor 236 will detect the pressure applied to the element 232 and transmit a corresponding sense signal through the wiring connections 233, thereby allowing the controller 235 to effect closed loop feedback control. The piezo-electric actuator 232 will receive an actuation signal through the wiring connections 233, change dimensions in accordance with the actuation signal, and apply a corresponding force between the manifold plate 228 and the nozzle insulator 229, adjustably controlling the sealing force therebetween.

Note that the piezo-electric sensors 235 may be provided to sense pressure at any desired position. Likewise, more than one piezo-electric actuator 232 may be provided, mounted serially or in tandem, in order to effect extended movement, angular movement, etc. Further, each piezo-electric actuator may be segmented into one or more arcuate, trapezoidal, rectangular, etc., shapes which may be separately controlled to provide varying sealing forces at various locations between the sealing surfaces. Additionally, piezo-electric actuators and/or actuator segments may be stacked in two or more layers to effect fine sealing force control, as may be desired.

The wiring 233 is coupled to any desirable form of controller or processing circuitry 235 for reading the piezo-electric sensor signals and/or providing the actuating signals to the piezo-electric actuators. For example, one or more general-purpose computers, Application Specific Integrated Circuits (ASICs), Digital Signal Processors (DSPs), gate arrays, analog circuits, dedicated digital and/or analog processors, hard-wired circuits, etc., may control or sense the piezo-electric element 232 described herein. Instructions for controlling the one or more processors may be stored in any desirable computer-readable medium and/or data structure, such floppy diskettes, hard drives, CD-ROMs, PAMs, EEPROMs, magnetic media, optical media, magneto-optical media, etc.

Use of the actuator 232 according to the present embodiment allows the various components of the hot runner nozzle assembly described above to be manufactured to lower tolerance, thereby decreasing the cost of manufacturing the injection molding machine components themselves. Previously, tolerances of 5-30 microns were used in order to achieve a functional nozzle assembly. Further benefits include the ability to adjust the alignment of the nozzle body and manifold more efficiently, thereby preventing leakage of melt within the apparatus and reducing the length of any equipment down time.

3. The Process of the First Embodiment

In operation, actuator element 232 is energized via wiring 233, thereby causing the element to increase in length along its longitudinal axis. According to the present embodiment, the energizing of element 232 (nominally 30.0 mm in length) will generate an increase in length of about 50 microns when approximately 1000 V is applied thereto. The actuation of element 232 provides sufficient force (from about 500 kg to about 7000 kg) so that nozzle insulator 229 and nozzle head 227 are sealingly pressed against manifold 220, thereby ensuring that an effective seal is maintained at the nozzle head/manifold interface through a range of operating temperatures applied to the nozzle assembly by the heater 226 and the resin flowing through the nozzle. Of course, varying levels of voltage may be applied at various times and to various actuator segments to effect fine control of the sealing force between the various sealing surfaces.

When the piezo-electric sensor 236 is used with the actuator 232 in a closed loop control configuration, the sensor element generates a signal in response to pressure between the nozzle head 227 and manifold 220, and transmits the signal via wiring 233 to the controller 235. Based on the signals received from the sensor, the controller then generates appropriate actuation signals that are transmitted via wiring 233 to the actuator element 232, energizing it in accordance with the data received from the sensor to accomplish proper sealing of the nozzle housing/manifold interface. For example, the controller 235 may be programmed to cause the sealing force to remain constant, or to increase and/or decrease according to a predetermined schedule, based on time, temperature, and/or number of cycles.

4. The Structure of the Second Embodiment

Figure 2:
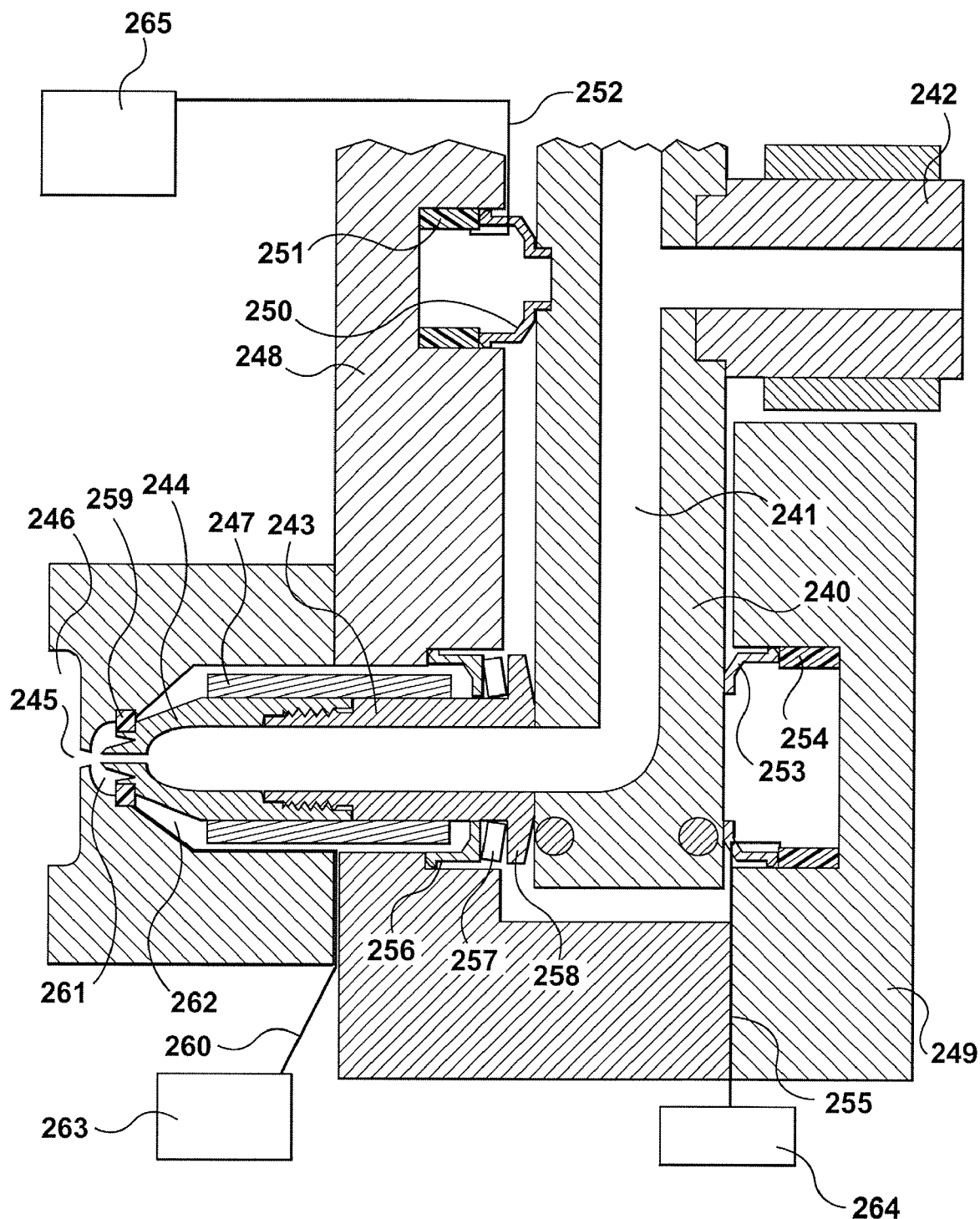
FIG. 2 shows a hot runner nozzle assembly incorporating an embodiment according to the present invention relating to the center and backup insulators and the nozzle tip seal interface.

FIG. 2 shows a second embodiment according to the present invention in which a hot runner assembly comprising a sprue bushing 242 is attached to a manifold 240 containing a melt channel 241 that connects to a nozzle housing 243 having a nozzle tip 244 threaded onto its end. The manifold 240 is spaced from the manifold plate 248 by center insulator 250 and nozzle housing insulator 256, and from the manifold backing plate 249 by backup insulator 253, such that heat losses from the manifold to the cooled mold plates are minimized.

The head of the nozzle housing 258 is constantly urged against the manifold 240 by spring washer 257 so that a seal is maintained at the interface of the two components so that pressurized melt flowing through channel 241 to the nozzle tip 244 and through the gate 245 to fill mold cavity 246 will not leak. The nozzle housing heater 247 keeps the housing at operating temperature, thereby allowing the melt to flow therethrough. The heater also causes the nozzle housing 243 and nozzle tip 244 to expand in length due to thermal expansion when they are heated to their operating temperature.

Where the nozzle tip 244 locates and seals in the gate area, an annular piezoceramic insert 259 is used to radially adjust the sealing diameter of the nozzle tip. Insert 259 is connected to the controller 263 by conduit 260. During operation, the gate bubble 261 fills with pressurized plastic and must be sealed so that the plastic does not escape alongside the nozzle tip to the air space 262 surrounding the nozzle housing. By using a piezoceramic insert 259 to radially adjust this sealing interface the manufacturing tolerances used for the specifications of the nozzle tip sealing diameter and the corresponding cavity insert bore sealing diameter can be widened, thereby significantly reducing the cost of machining of these components.

A piezoceramic insert 251, or the like, may also be placed between the center insulator 250 and the manifold plate 248. Similarly another piezoceramic insert 254, or the like, may be placed between the backup insulator 253 and the manifold backing plate 249. These inserts provide a means to sense and adjust the compressive force being transmitted through the respective insulators and to provide an additional sealing force adjusting means at the nozzle housing/manifold interface. The inserts are connected to controller 236 via conduits 252 and 255, respectively.

Optionally, one or more separate piezoceramic sensors may be provided to detect pressure caused by positional changes within the nozzle assembly. These sensors may also be connected by conduits 252, 255, and 260 to the controller 236. The piezo-electric elements used in accordance with the present invention (i.e., the piezo-electric sensors and/or piezo-electric actuators) may comprise any of the devices manufactured by Marco Systemanalyse und Entwicklung GmbH. The piezo-electric sensors can detect the pressure at various interfaces within the nozzle assembly and transmit a corresponding sense signal through the conduits 252, 255, and 260, thereby effecting closed loop feedback control. The piezo-electric actuators then receive actuation signals through the conduits 252, 255, and 260, and apply corresponding forces. Note that piezo-electric sensors may be provided to sense pressure from any desired position. Likewise, more than one piezo-electric actuator may be provided in place of any single actuator described herein, and the actuators may be mounted serially or in tandem, in order to effect extended movement, angular movement, etc.

As mentioned above, one of the significant advantages of using the above-described active element inserts is to allow the manufacturing tolerances used for the depth of the bores in the manifold plate and manifold backing plates that house the respective insulators to be widened, thereby significantly reducing the cost of machining those features in the plates. Similarly, the manufacturing tolerances used for the height of the center and backup insulators can also be widened, further reducing the cost of machining these components. Another advantage of using piezoceramic inserts in the configurations described above is that the excellent thermal insulative properties of the piezoceramic material reduces the transmission of heat from the heated components to the cooled mold plates. In some specific configurations, it may be possible to eliminate entirely the backup insulator thereby saving its cost.

5. The Process of the Second Embodiment

Similar to the process of the first embodiment, in operation, the actuator elements 251, 254, and 259 are energized via conduits 252, 255, and 260, thereby causing the elements to increase in axial length and/or radial thickness. According to the present embodiment, the energizing of elements 251, 254, and 259 preferably will generate an increase in length in each element of about 0.1 mm when approximately 1000 V is applied thereto. The actuation of elements 251 and 254 provides sufficient force (from about 500 kg to about 10,000 kg) to ensure that effective seals are maintained at the various junctions within the nozzle assembly throughout a range of operating temperatures. These junctions include, without limitation, the junction between sprue bushing 242 and manifold 240, and the junction between manifold 240 and nozzle housing 258. In addition, actuation of element 259 ensures that nozzle tip 244 remains well-centered and properly aligned with respect to the gate 245 of the cavity insert In an alternate embodiment, piezoceramic elements acting as sensors (not shown) are used in combination with the actuating elements to provide a closed loop feedback configuration, as described above. The sensor elements generate signals in response to pressure between various interfaces within the nozzle assembly, and transmit the signals via conduits 252, 255, and 260 to controllers 265, 264, and 263. Based on the signals received from the sensors, the controllers then generate other signals that are transmitted via conduits 252, 255, and 260 to the actuators, energizing them in accordance with the data received from the sensors to accomplish proper sealing of the various nozzle assembly interfaces.

6. The Structure of the Third Embodiment

Figure 3:
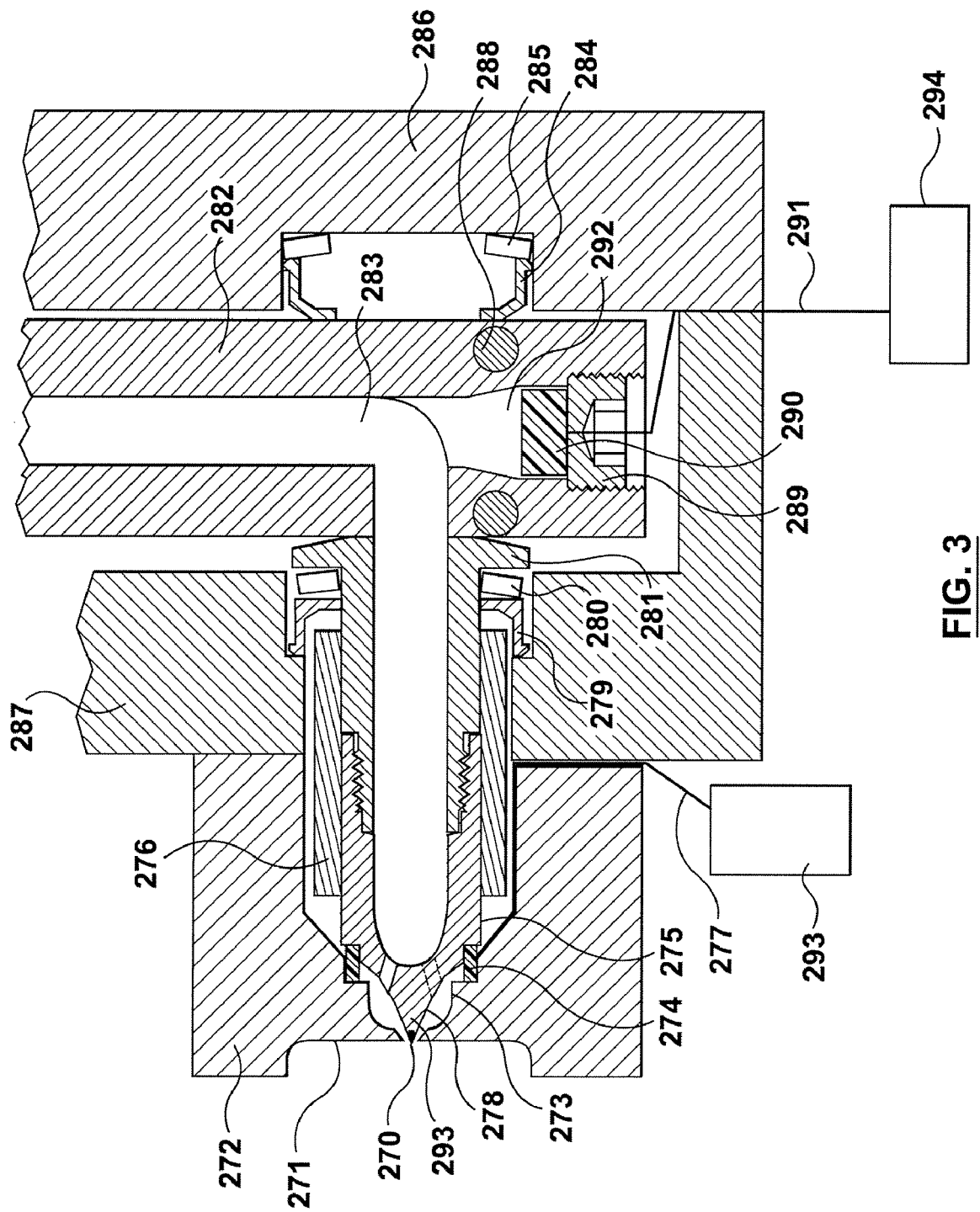
FIG. 3 shows a hot runner nozzle assembly incorporating the present invention relating to the nozzle tip height setting and the manifold channel sealing plug.

FIG. 3 shows a third preferred embodiment in accordance with the present invention, in which a hot runner assembly includes a manifold 282 containing a melt channel 283 that connects to a nozzle housing 281. A nozzle tip 275 is threaded onto the end of the nozzle housing 281. The manifold 282 is spaced from the manifold backing plate 286 by backup insulator 284 and spring washer 285, and is also spaced from the manifold plate 287 by the nozzle housing insulator 279 and spring washer 280, such that heat losses from the manifold to the cooled mold plates are minimized. The head of the nozzle housing 281 is constantly urged against the manifold 282 by spring washer 280 so that a seal is maintained at the interface of the two components so that pressurized melt flowing through channel 283 to the nozzle tip 275 and through the gate 270 to fill mold cavity 271 will not leak. The nozzle housing heater 276 keeps the housing at operating temperature thereby allowing the melt to flow therethrough.

The heater 276 also causes the nozzle housing 281 and nozzle tip 275 to expand in length due to thermal expansion when they are heated to their operating temperature. This expansion causes the end 293 of the nozzle tip 275 to extend further through the gate orifice 270. If the tip's end 293 is not maintained flush with the mold cavity surface, molding and leakage problems may arise. If the tip end 293 extends too far, it projects into the molded part causing a blemish and may also reduce the effective annulus area of the gate, thereby impeding melt flow during injection. If the tip end 293 does not extend far enough and is short of the mold cavity surface the gate vestige increases, again causing a blemish on the molded part. It may also cause insufficient heat to be conducted to the gate area by the tip, causing the gate to freeze off.

The tip end position is typically controlled by tight tolerancing of the lengths of the components concerned. For example, each of the length of the tip, 275, the length of the nozzle housing 281, the thickness of the manifold 282, the height of the backup insulator 284 and the pocket depth for the said insulator 284 in the manifold backing plate 286 are tightly toleranced, as are the height of the nozzle housing insulator 279 and the depth of its pocket in the manifold plate 287 and the depth of the nozzle housing pocket and the gate bubble detail in the cavity insert 272. This tight tolerance manufacturing drastically increases the cost of manufacturing the hot runner assembly.

By installing a piezoceramic actuator 274, connected to the controller 295 by conduit 277, the tip end 293 position can be accurately controlled and adjusted during the molding operation based, for example, on visual inspections of the molded parts by the operator. A particularly preferred insert 274 has a tubular shape, although other configurations are considered within the scope of the present invention, as are configurations where multiple actuator inserts and/or actuator segments are utilized to achieve a similar effect. The sealing ring 273 on the nozzle tip 275 maintains a sliding seal in the bubble area while allowing the nozzle tip end 293 to alter its position. The insert 274 also seals the gate bubble and prevents leakage of the plastic into the air space surrounding the nozzle housing. Of course, where the nozzle is a multi-material or coinjection nozzle, various types of piezoceramic actuators may disposed with respect to the plural injection paths to effect tip height adjustment, as desired.

Figure 4:
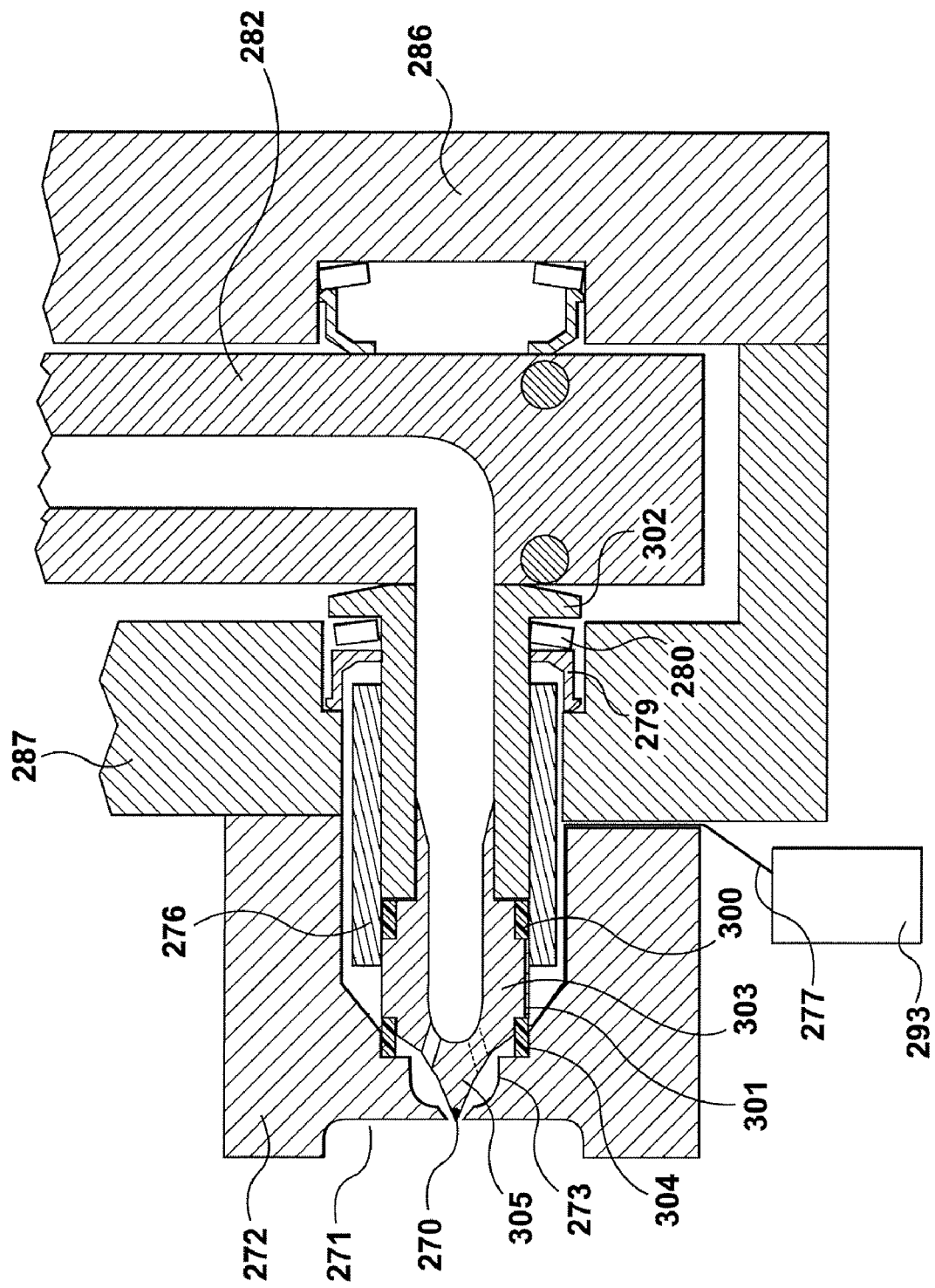
FIG. 4 shows an alternative embodiment of a hot runner nozzle assembly incorporating the present invention relating to the nozzle top height setting.

An alternate embodiment for adjusting tip height is shown in FIG. 4. Two piezoceramic actuators 300 and 304 are positioned at each end of the tip 305 which can slide within the bore of the nozzle housing 302. The actuators are connected by communication wire 301 and to the controller 293 via communication wire 277. The tip height with respect to the gate orifice 270 can be adjusted axially by combined actuation of the two actuators 300 and 304. Alternately, actuator 300 can be replaced by a spring to urge the tip 305 away from the nozzle housing 302.

FIG. 3 also shows a melt channel plug configuration in the manifold 282. A piezoceramic actuator 290 is placed between the melt channel plug 292 and the set screw 289 that is threaded into the manifold 282 and tightened against its end face. The insert 290 is connected to the controller 294 via conduit 291. The plug 292 is used to plug the end of the melt channel 283 after it has been machined in the manifold 282. After insertion, the plug 292 has its channel face contour machined in situ to blend the radius of the channel 283 in order to provide a smooth surface, thereby preventing areas where the melt can hang up and degrade. Consequently, once in position and machined, the plug 292 should be prevented from moving so that a seal is maintained. The active material elements of the present invention are used in order to prevent such movement. According to a preferred embodiment, movement is prevented by energizing one or more actuators 290 to provide a force adequate to retain the plug 292 in its preferred position. In addition, one or more sensors (not shown) may be provided to sense any movement of plug 292 and thereby provide closed-loop feedback control over the position of the plug 292.

7. The Process of the Third Embodiment

In operation, by energizing the insert 274 to increase its axial length, the tip end 293 can be moved away from the gate orifice. This movement of the tip and nozzle housing is absorbed in the mold structure by the spring washer 285 mounted behind the backup insulator 284. By de-energizing the insert 274 to decrease its height, the tip end 293 can be moved toward the gate orifice. The spring washer 285 constantly urges the backup insulator 284, the manifold 282, and the nozzle housing 281 towards the gate area so that, when the insert 274 reduces in axial length, a plastic seal is maintained at the nozzle housing/manifold interface. By providing a means for the dynamic adjustment of the nozzle tip position during the molding operation, the cost of manufacture of the hot runner assembly is significantly reduced because the aforementioned tight tolerancing of most of the multiple component sizes is no longer required. Also, the added convenience of being able to adjust the tip position during operation avoids the lengthy downtime and remanufacturing costs of the earlier "cut and try" method.

With respect to the melt channel plug 292 provided to seal the melt channel 283 in manifold 282, a piezoceramic actuator 290 is preferably provided between the melt channel plug 292 and a set screw provided to hold the melt channel plug 292 in place. When energized, actuator 290 increases in radial thickness, urging the plug 292 tighter against its tapered seat in the manifold, thereby ensuring a good seal to prevent plastic leakage from the runner. This configuration also allows the manufacturing tolerances used for the specifications of the melt channel plug and the corresponding manifold seat to be increased, including the tightened torque of the set screw. This significantly reduces the cost of machining of these components.

In an alternate embodiment, additional piezoceramic elements acting as one or more sensors are used in combination with the actuators to provide closed loop feedback control. The sensor element generates a signal in response to pressure between the various components of the nozzle assembly, and transmits a corresponding signal via conduits to the controller 236. Based on the signals received from the sensors, the controller 236 then generates actuation signals that are transmitted via conduits to the actuator elements, energizing them in accordance with the data received from the sensors to accomplish proper sealing of the nozzle assembly interfaces and proper adjustment of tip height.

8. Conclusion

Thus, what has been described is a method and apparatus for using active material elements in an injecting molding machine, separately and in combination, to effect useful improvements in injection molding apparatus including the provision of adjustable seals in a hot runner assembly, and adjustable hot runner nozzle tip height.

Advantageous features according the present invention include: 1. A piezo ceramic element used singly or in combination to generate a force and/or sense a force in an injection molding apparatus; 2. Nozzle sealing apparatus using a closed loop controlled force generating unit acting on a nozzle assembly; 3. Hot runner assembly sealing interfaces adjustably sealed using local force-generating units; 4. Dynamic adjustment of nozzle tip height using a local force-generating unit.

While the present invention provides distinct advantages for injection-molded PET plastic preforms generally having circular cross-sectional shapes perpendicular to the preform axis, those skilled in the art will realize the invention is equally applicable to other molded products, possibly with non-circular cross-sectional shapes, such as, pails, paint cans, tote boxes, and other similar products. All such molded products come within the scope of the appended claims.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patent documents discussed above (and particularly the applications discussed above in paragraph are hereby incorporated by reference into the Detailed Description of the Preferred Embodiments.

What is claimed is:

1. A method of sealing a nozzle body against a manifold of an injection mold, comprising:

energizing an active material element actuator so as to generate a sealing force between said nozzle body and said manifold sensing pressure between said nozzle body and said manifold; and controlling the energizing of said active material element actuator in a closed loop feedback system, based on sensed pressure between the nozzle body and manifold.

2. A method for sealing (i) a first surface comprising an injection molding nozzle head and (ii) a second surface comprising a hot runner manifold, in an injection mold, comprising the steps of:

disposing an active material actuator to move the first surface toward the second surface; and actuating said active material actuator to cause said active material actuator to seal the injection molding nozzle head to the hot runner manifold, wherein said active material actuator comprises a tubular piezo-electric actuator configured to expand axially upon the application of an electrical voltage.

3. A method for sealing (i) a first surface comprising an injection molding nozzle head and (ii) a second surface comprising a hot runner manifold, in an injection mold, comprising the steps of:
disposing an active material actuator to move the first surface toward the second surface;
actuating said active material actuator to cause said active material actuator to seal the injection molding nozzle head to the hot runner manifold;
disposing an active material sensor to detect pressure between the first surface and the second surface and provide a sense signal corresponding thereto; and
providing to said active material actuator an actuation signal which corresponds to the pressure detected by said sensor.

4. A method according to claim 2, further comprising the steps of:
disposing an insulator between the first surface and the second surface; and
disposing said active material actuator between the insulator and the first surface.

5. A method for moving the nozzle tip of an injection mold hot runner nozzle with respect to a mold gate, comprising:
disposing an active material actuator to move the nozzle tip with respect to the mold gate, wherein said active material actuator comprises a tubular piezo-electric actuator configured to expand axially upon the application of an electrical voltage; and
supplying an actuation signal to said active material actuator to cause said active material actuator to change at least one dimension to effect relative movement between the nozzle tip and the mold gate.

6. A method according to claim 5, further comprising the step of disposing biasing structure to bias the nozzle toward the mold gate, and wherein said active material actuator is disposed to move the nozzle against the biasing structure.

7. A method according to claim 5, further comprising:
using a sensor for detecting at least one of (i) a distance between the nozzle and the mold gate, and (ii) a pressure between the nozzle and the mold gate, and to output a sense signal corresponding thereto; and
provide the actuation signal to cause the active material actuator to adaptively adjust the distance between the nozzle and the mold gate in accordance with the sense signal.

8. A method according to claim 7, wherein said sensor and said actuator each comprises piezoceramic element.

9. A method according to claim 5, wherein the nozzle has a nozzle head disposed adjacent a hot runner manifold, and further comprising the step of disposing a second active material actuator configured to (i) change at least one dimension upon receipt of an electrical voltage and (ii) effect a seal between the nozzle head and the hot runner manifold.

10. A sealing method in an injection mold having a manifold plate and a nozzle, comprising:
disposing a piezo-electric sensor adjacent at least one of the nozzle and the manifold plate;
sensing with the sensor a compressive force applied between the nozzle and the manifold plate, and generating a corresponding sense signal;
disposing a piezo-electric actuator between the nozzle and the manifold plate;
changing a dimension of said piezo-electric actuator upon application of the sense signal from said sensor to change a sealing force between the nozzle and the manifold plate.

11. A method according to claim 10, wherein said piezo-electric sensor is configured to be disposed in an annular groove in at least one of the nozzle and the manifold plate.

12. A method according to claim 10, further comprising the step of disposing a plurality of piezo-electric sensors at different locations between the nozzle and the manifold plate.

13. A method according to claim 10, further comprising the step of deposing a processor to receive the sense signal from said piezo-electric sensor and to generate one or more of corresponding (i) a clamping force signal, (ii) an injection pressure signal, and (iii) an injection rate signal.

14. A method according to claim 10, further comprising the step of deposing a second piezo-electric actuator between a manifold and the manifold plate to apply a sealing force between the manifold and the manifold plate.

15. A method according to claim 10, wherein said piezo-electric actuator is disposed adjacent said piezo-electric sensor, and wherein said piezo-electric sensor senses a change in dimension of said piezo-electric actuator corresponding to a change in distance between the nozzle and the manifold plate.

16. A method according to claim 10, further comprising the step of disposing a plurality of piezo-electric actuators at different locations between the nozzle and the manifold plate.

17. A method according to claim 16, wherein said plurality of piezo-electric actuators are disposed to control a deflection of the manifold plate.

18. A method according to claim 10, further comprising the step of disposing a plurality of piezo-electric sensors at different locations between the nozzle and the manifold plate, and wherein the injection molding machine includes a plurality of nozzles, and wherein at least one piezo-electric sensor and at least one piezo-electric actuator is disposed adjacent each nozzle.

19. A method according to claim 18, further comprising the step of providing a control structure configured to (i) receive sense signals from said plurality of piezo-electric sensors, and (ii) transmit actuator signals to said plurality of piezo-electric actuators to control a deflection of the manifold plate.

20. A method for sealing a nozzle head against an injection mold manifold, comprising:
disposing a nozzle body with a nozzle tip insert;
disposing a nozzle insulator around said nozzle body;
disposing a tip insulator in said nozzle tip;
disposing a manifold;
disposing a manifold plate;
disposing a mold cavity insert;
disposing a piezoelectric actuator between at least two of: said nozzle body, said nozzle tip insert, said nozzle insulator, said tip insulator, said manifold, and said manifold plate; and
providing an electrical signal to piezoelectric actuator to provide a sealing force between the nozzle head and the injection mold manifold.

21. A method for sealing a hot runner assembly, comprising:
disposing a sprue bushing;
disposing a manifold;
disposing a nozzle body comprising a nozzle housing and a nozzle tip;
sealing interfaces between the sprue bushing and the manifold and between the manifold and the nozzle, by changing a dimension of active material elements;

sensing pressure between said nozzle body and said manifold; and controlling the energizing of at least one of said active material elements in a closed loop feedback system, based on sensed pressure between the nozzle body and manifold.

22. A method for controlling the position of a melt channel plug with respect to the melt channel in a molding machine, comprising:

disposing the melt channel plug adjacent the melt channel;

disposing a set screw adjacent the melt plug;

disposing an active material element between the melt channel plug and the set screw; and providing an electrical signal to the active material element to control the position of the melt channel plug with respect to the melt channel.

23. A method for maintaining a seal around a melt channel plug provided in a melt channel of an injection molding manifold, comprising:

sensing pressure between said melt channel plug and said melt channel; and regulating sealing forces applied by said melt channel plug on said melt channel by actuating a piezoelectric motor using a closed loop feedback system, based on the sensed pressure between said melt channel plug and said melt channel.

* * * * *